United States Patent
Olston et al.

(10) Patent No.: US 8,312,011 B2
(45) Date of Patent: *Nov. 13, 2012

(54) SYSTEM AND METHOD FOR AUTOMATIC DETECTION OF NEEDY QUERIES

(75) Inventors: Christopher Olston, Mountain View, CA (US); Sandeep Pandey, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/108,233

(22) Filed: May 16, 2011

(65) Prior Publication Data
US 2011/0218991 A1    Sep. 8, 2011

Related U.S. Application Data

(63) Continuation of application No. 12/046,123, filed on Mar. 11, 2008, now Pat. No. 7,970,760.

(51) Int. Cl.
   *G06F 7/00* (2006.01)
   *G06F 17/30* (2006.01)
(52) U.S. Cl. ........ 707/723; 707/748
(58) Field of Classification Search ........ None
   See application file for complete search history.

(56) References Cited

U.S. PATENT DOCUMENTS

| | | | |
|---|---|---|---|
| 6,917,980 B1 * | 7/2005 | Gusler et al. | 709/229 |
| 7,283,998 B2 * | 10/2007 | Moon et al. | 707/740 |
| 7,318,029 B2 * | 1/2008 | Coyle et al. | 704/231 |
| 2005/0234877 A1 * | 10/2005 | Yu | 707/3 |
| 2005/0246332 A1 * | 11/2005 | Wang et al. | 707/3 |
| 2005/0251496 A1 * | 11/2005 | DeCoste et al. | 707/1 |
| 2007/0106660 A1 * | 5/2007 | Stern et al. | 707/5 |
| 2007/0112840 A1 * | 5/2007 | Carson et al. | 707/102 |
| 2007/0116360 A1 * | 5/2007 | Jung et al. | 382/176 |
| 2007/0118873 A1 * | 5/2007 | Houh et al. | 725/136 |
| 2007/0154178 A1 * | 7/2007 | Yamamoto et al. | 386/95 |
| 2010/0094853 A1 * | 4/2010 | Telloli et al. | 707/706 |
| 2010/0268741 A1 * | 10/2010 | Holzapfel et al. | 707/784 |

* cited by examiner

*Primary Examiner* — Tony Mahmoudi
*Assistant Examiner* — Tuan A Pham
(74) *Attorney, Agent, or Firm* — Seth H. Ostrow; Ostrow Kaufman LLP

(57) ABSTRACT

The present invention relates to methods, systems, and computer readable media comprising instructions for identifying needy queries for which additional responsive content is needed. The method of the present invention comprises receiving a query comprising one or more terms and retrieving one or more content items identified as responsive to the query, the one or more content items ranked according to one or more ranking techniques. A score is generated for the one or more ranked content items identified as responsive to the query. A determination is thereafter made as to whether the query is needy based upon a comparison of the one or more scores associated with the one or more content items identified as responsive to the query and a needy query score threshold.

11 Claims, 3 Drawing Sheets

SYSTEM AND METHOD FOR AUTOMATIC DETECTION OF NEEDY QUERIES

CLAIM OF PRIORITY

This application is a continuation of and claims priority to U.S. Ser. No. 12/046,123, filed Mar. 11, 2008, entitled "SYSTEM AND METHOD FOR AUTOMATIC DETECTION OF NEEDY QUERIES", which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to identification of needy queries. More specifically, embodiments of the present invention provide systems, methods and computer program products for identifying one or more queries requiring additional content responsive to such queries.

BACKGROUND OF THE INVENTION

Search engines are commonly used to search the large volume of content items that are available on computer networks, such as the World Wide Web, thereby enabling users to locate content items of interest. A typical search engine is capable of accessing web pages, hypertext documents, images, video, audio, and other content items from the Internet or other network that may be responsive to a search that a given user is executing.

To use a given search engine, a user of a client device typically navigates to the search engine and enters one or more search terms or keywords, e.g., a search query. On the basis of the search query, the search engine identifies one or more content items that are responsive to the one or more search terms or keywords comprising the search query. The content items identified by the search engine form a result set that is displayed to the user issuing the query.

A search engine may rank the content items that are responsive to a given query according to relevance, e.g., a list or other type of arrangement that allows a user of the search engine to easily ascertain those results that are more likely to be relevant to the search query. For example, a search engine may determine that a first given content item that is responsive to a given query is more relevant than a second given content item that is responsive to the query. Accordingly, the search engine may place the first content item in a more prominent position in a result set of responsive content items, such as at the top of a list of ranked content items, in comparison to the position at which the search engine places the second content item.

Queries that users of a search engine frequently generate may have a plurality of relevant content items that the search engine may identify as responsive to such queries. For example, the query "NFL Football" a given user provides may result in a plurality of web sites providing football statistics, scores, game schedules, etc. In contrast, queries that users of a search engine generate less frequently may have few, if any, items of content that a search engine identifies as responsive to such queries. For example, a given user may generate a query for information regarding an actor that plays a role in only a single movie that is not widely known. A search engine may identify very few, if any, web sites containing information responsive to the user's query, indicating that additional content responsive to the query may be necessary. Similarly, although a search engine may identify a plurality of web sites responsive to the user's query, such sites may not contain highly relevant or responsive content, indicating the search engine's inaccuracy in identifying responsive content.

Identification of queries with few, if any, responsive content items or content items identified as responsive to a given query that contain little, if any, actual responsive information may be used to determine queries for which additional content is necessary. Similarly, identification of queries with few responsive content items or a plurality of irrelevant content items may be used by search engines to increase the likelihood of retrieving content items that are highly responsive to such queries. While current techniques exist for the identification of content responsive to queries, there exists a need to identify queries for which supplemental content is necessary, such queries referred to herein as needy queries.

SUMMARY OF THE INVENTION

The present invention is directed towards systems and methods for identifying needy queries for which additional responsive content is needed. The method of the present inventions comprises receiving a query comprising one or more terms and retrieving one or more content items identified as responsive to the query, the one or more content items ranked according to one or more ranking techniques. According to one embodiment of the present invention, the one or more content items retrieved are ranked according to relevance with respect to the query.

A score is thereafter generated for the one or more ranked content items identified as responsive to the query. According to one embodiment of the present invention, generating a score for the one or more ranked content items identified as responsive to the query comprises generating a score indicating a degree to which the one or more ranked content items are responsive to the query. The score generated for a given content item may be generated based upon a degree to which one or more ranking features of the content item are responsive to the query, such ranking features including, but not limited to, in-links associated with the content item, anchor text associated with the content item, a uniform resource locator associated with the content item, a term frequency inverse document frequency associated with the content item with respect to the query, and a title associated with the content item.

A determination is thereafter made as to whether the query is needy based upon a comparison of the one or more scores associated with the one or more content items identified as responsive to the query and a needy query score threshold. According to one embodiment of the present invention, determining whether the query is needy comprises calculating an average of the scores associated with the one or more ranked content items identified as responsive to the query and performing a comparison of the calculated average with respect to the needy query score threshold. In the event the calculated average does not meet the needy query score threshold, the query is identified as needy.

The present invention is further directed towards systems for identifying needy queries for which additional responsive content is needed. The system of the present inventions comprises a needy query component operative to receive a query comprising one or more terms and retrieve one or more content items identified as responsive to the query, the one or more content items ranked according to one or more ranking techniques, wherein the one or more content items retrieved are ranked according to relevance with respect to the query.

The needy query component generates a score for the one or more ranked content items identified as responsive to the query. According to one embodiment of the present invention, the needy query component generates a score for the one or more ranked content items identified as responsive to the query indicating a degree to which the one or more ranked content items are responsive to the query. The score generated for a given content item by the needy query component may be generated based upon a degree to which one or more ranking features of the content item are responsive to the query. The ranking features may comprise in-links associated with the content item, anchor text associated with the content item, a uniform resource locator associated with the content item, a term frequency inverse document frequency associated with the content item with respect to the query, and a title associated with the content item.

The needy query component thereafter makes a determination as to whether the query is needy based upon a comparison of the one or more scores associated with the one or more content items identified as responsive to the query and a needy query score threshold. According to one embodiment of the present invention, the needy query component calculates an average of the scores associated with the one or more ranked content items identified as responsive to the query and thereafter performs a comparison of the calculated average with respect to the needy query score threshold. In the event the calculated average does not meet the needy query score threshold, the needy query component identifies the query as needy.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration, exemplary embodiments in which the invention may be practiced. It is to be understood that other embodiments may be utilized and structural changes may be made without departing from the scope of the present invention.

Figure 1:
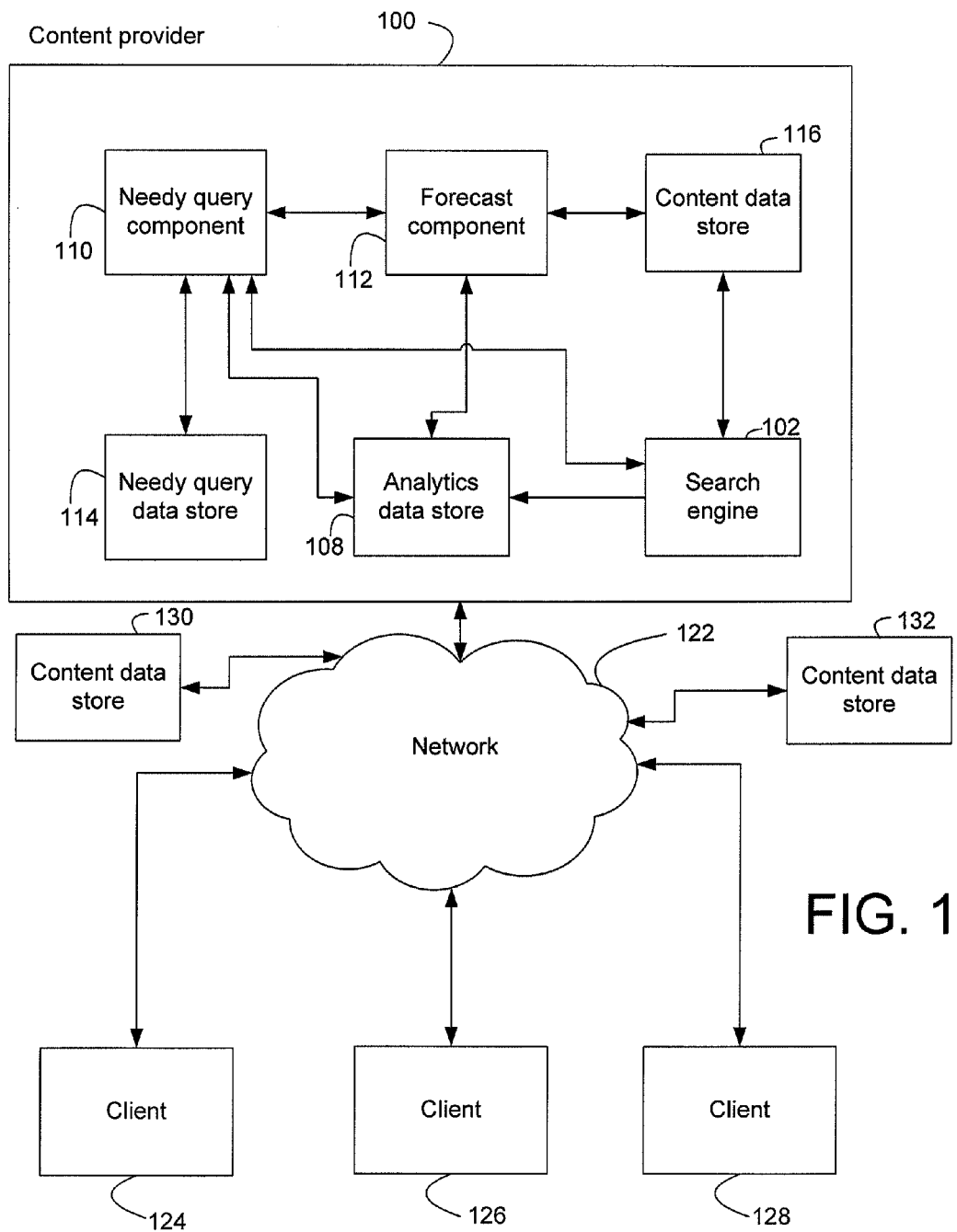
FIG. 1 is a block diagram illustrating one embodiment of a system for identifying one or more needy queries according to one embodiment of the present invention.

FIG. 1 illustrates one embodiment of a system for automatically detecting one or more needy queries, which may be used for a variety of purposes, as described in greater detail herein. According to the embodiment illustrated in FIG. 1, a content provider 100 maintains one or more local content data stores 116, which may comprise one or more accessible memory structures such as servers or databases capable of providing for the retrieval and storage of a plurality of content, including, but not limited to, web pages, search queries, advertisements, etc. Additionally, as FIG. 1 illustrates, the content provider may further access one or more remote content data stores 130 and 132, which similarly may comprise one or more accessible memory structures capable of providing for the retrieval and storage of a plurality of content. The content provider may access such remote content data stores 130 and 132 via a network 122, which may comprise any type of computerized network capable of transferring data, including, but not limited to, the Internet.

A search engine 102 at the content provider 100 is operative to receive one or more queries generated by one or more users of client devices 124, 126, and 128. According to one embodiment, a client device 124, 126, and 128 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

Users of client devices 124, 126, and 128 communicatively coupled to the network 122 may submit search queries, comprising one or more terms, to the search provider 100. A typical query received from a user of a client device 124, 126, and 128 has one or more terms. For example, the query "wireless notebook computer" contains three terms and may be referred to as a three-term query. Similarly, queries containing only one term are referred to as one-term queries, queries containing two terms are two-term queries, etc. The search engine 102 may use a space or other delimiter character to identify the individual terms comprising a given query.

The search engine 102 at the content provider 100 may utilize the given query, comprising one or more terms, to identify content items, such as web pages, video clips, audio clips, documents, etc., that are responsive to the one or more terms. According to one embodiment, the search engine 102 at the content provider 100 uses communication pathways that the network 122 provides to access one or more remote 130 and 132 or local 116 content data stores to locate content items that are responsive to a given query that the search engine 102 receives from a user of a client device 124, 126, and 128.

According to one embodiment of the present invention, the content that the search engine 102 identifies as responsive to a given query from a user of a client device 124, 126, and 128 is ranked through use of a ranking function. The search engine 102 may use one or more features of the query, and one or more features of the one or more content items that the search engine 102 identifies as responsive to the query, to rank the one or more content items one the basis of relevance. For example, the search engine 102 may examine the Term Frequency Inverse Document Frequency ("TF/IDF") of the one or more terms with respect to the one or more content items that the search engine 102 identifies as responsive to the query. Alternatively, or in conjunction with the foregoing, the one or more content items may comprise one or more web pages. Accordingly, the search engine 102 may perform an analysis of the in-links associated with a given web page, the anchor text associated with such in-links, and the text comprising the URL of the given web page to identify the relevance of the given web page with respect to the query.

The search engine 102 is operative to deliver a given query, as well as the one or more content items identified as responsive to the query ranked according to one or more ranking techniques, to an analytics data store 108 at the content provider 100. The analytics data store 108 is operative to maintain one or more queries and the one or more content items, ranked according to one or more ranking techniques, which the search engine 102 identifies as responsive to the one or more queries. The content provider 102 implements the analytics data store 108 as an accessible memory structure, such as an index, server, or database capable of providing for the retrieval and storage of a plurality of queries and responsive content items, including, but not limited to, web pages.

A needy query component 110 at the content provider 100 is operative to periodically identify one or more queries from users of client devices 124, 126, and 128 that are needy. According to one embodiment of the present invention, a needy query comprises a query for which supplemental responsive content is necessary, such as a query with few, if any, responsive content items. According to another embodiment of the present invention, a needy query comprises a query with few, if any, content items that are relevant with respect to the query. According to a further embodiment of the present invention, a needy query comprises a query that users of client devices 124, 126, and 128 generate at a frequency above a given threshold and for which limited or no content items are responsive. Alternatively, or in conjunction with the foregoing, a needy query comprises a query for which the degree of relevancy of one or more content items identified as responsive to the query is not as high as desired.

According to one embodiment of the present invention, the needy query component 110 is operative to select one or more queries from the analytics data store 108, as well as the one or more ranked content items identified as responsive to the one or more selected queries. The needy query component 110 is further operative to assign a numerical score to the one or more ranked content items that the search engine 102 identifies as responsive to a given selected query. The needy query component 110 may utilize a variety of techniques to assign a score to the one or more ranked content items, as is described in greater detail herein.

The needy query component 110 is also operative to identify whether a given query is needy through use of the scores assigned to the one or more content items that the search engine 102 identifies as responsive to a given query. According to one embodiment of the present invention, the needy query component 110 calculates the average score of the one or more content items that the search engine 102 identifies as responsive to a given query. In the event that the calculated average is at or below a given threshold, the needy query component 110 identifies the query as a needy query. According to another embodiment of the present invention, the needy query component 110 selects the K content items associated with the greatest scores and determines whether the sum of such content items meets or exceeds a given threshold. If the K scores associated with the K selected content items does not meet or exceed the threshold, the needy query component 110 may identify the query as needy.

According to the embodiment illustrated in FIG. 1, the content provider 100 maintains a forecast component 112 that is operative to periodically generate one or more forecasted queries for the delivery to the needy query component 110 in order to determine whether such forecasted queries are needy. According to one embodiment of the present invention, the forecast component 112 is operative to periodically perform a search of the analytics data store 108, which as previously described, maintains the one or more queries previously generated by users of client devices 124, 126, and 128. Through use of the information identifying the one or more queries previously generated that are maintained in the analytics data store 108, the forecast component is operative to generate forecasted queries that have not been previously generated by users of client devices 124, 126, and 128.

Alternatively, or in conjunction with the foregoing, the forecast component 112 may be operative to periodically perform a search of one or more local or remote content data stores, 116, and 130 and 132, respectively, to identify recent or new content and generate forecasted queries based upon such content. For example, local 116 and remote 130 and 132 may be updated with information, such as a recent news event. Accordingly, the forecast component 112 may identify such recent content and generate one or more forecasted queries in order to determine whether such forecasted queries are needy.

A given forecasted query generated by the forecast component 112 may be delivered to the needy query component. The needy query component 110 is operative to deliver the forecasted query to the search engine 102. The search engine 102 may perform a search of local 116 and remote 130 and 132 content data stores to identify and rank content items responsive to the forecasted query. The ranked content items that the search engine 102 identifies as responsive to the forecasted query may thereafter be delivered to the needy query component 110. The needy query component 110 may then perform an analysis on the forecasted query and the ranked content items to determine whether the query is needy, according to methods described herein.

The one or more queries that the needy query component 110 identifies as needy by may be delivered to a needy query data store 114. The one or more needy queries maintained in the needy query data store 114 may be used for numerous purposes. According to one embodiment of the present invention, the one or more needy queries are used to identify and recommend content to be posted. For example, a given query may be identified as needy, as the query may have limited or no content items that are responsive to the query. Accordingly, a recommendation may be delivered to one or more advertisers to generate content, such as advertisements and web pages, responsive to the query. Alternatively, or in conjunction with the foregoing, the search engine 102 may be modified to identify additional content items that may be responsive to the query to determine whether such a modification results in the search engine 102 identifying additional content items as responsive to the query, thus resulting in the query being less needy.

Figure 2:
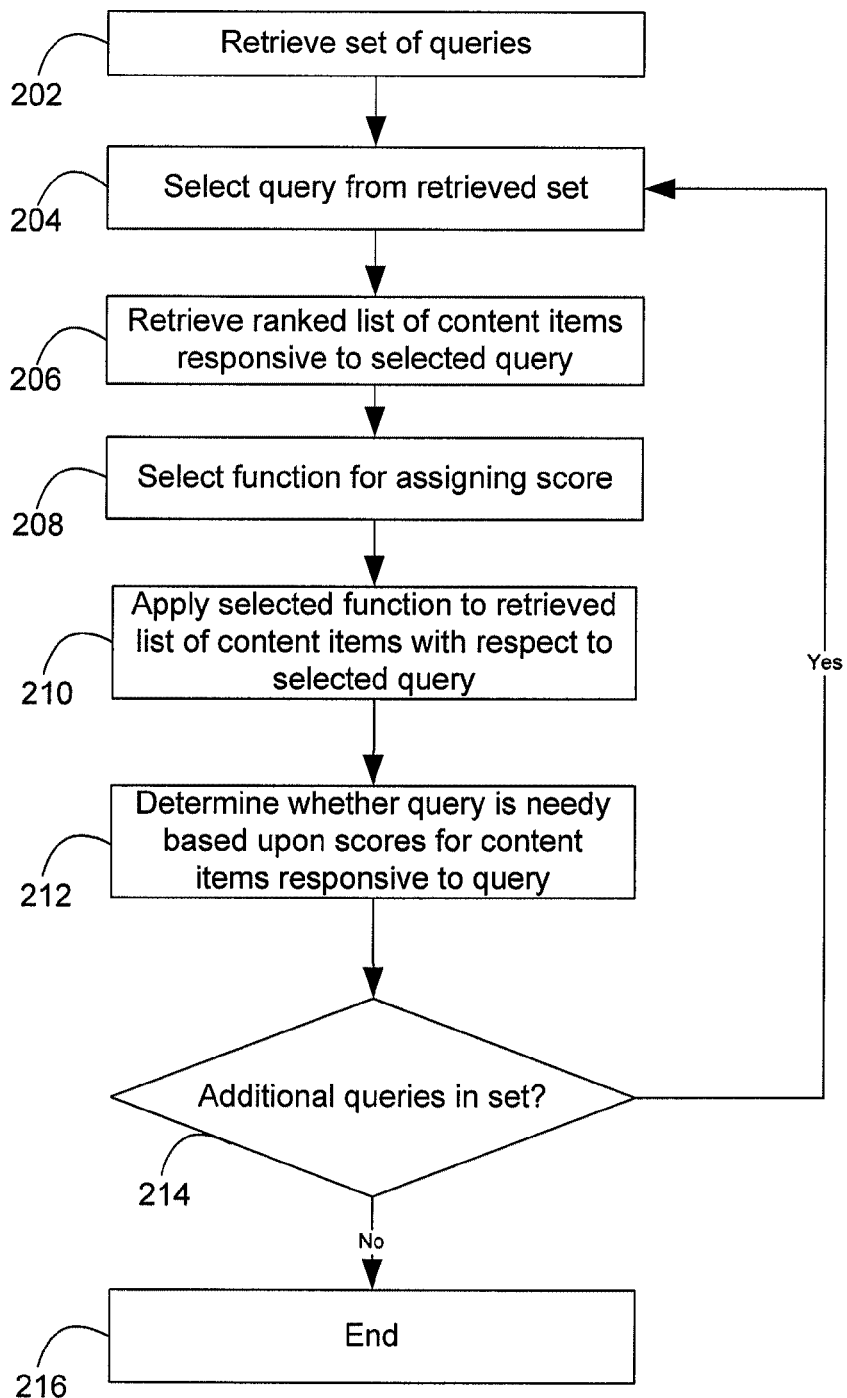
FIG. 2 is a flow diagram illustrating one embodiment of a method for identifying one or more needy queries according to one embodiment of the present invention.

FIG. 2 is a flow diagram illustrating one embodiment of a method for identifying a one or more queries as needy queries. According to the embodiment of FIG. 2, a set of queries is retrieved, step 202, and a given query is selected from among the one or more queries comprising the retrieved set, step 204. Content items responsive to the selected query are retrieved, wherein the content items retrieved are ranked according to one or more ranking techniques, step 206. For example, the one or more content items retrieved in step 206 may comprise one or more web pages, which have been previously ranked according to relevance with respect to the query by analyzing one or more features of the query and a given web page.

A function is thereafter selected for assigning scores to the one or more ranked content items retrieved for the selected query, step 208. According to one embodiment of the present invention, the score calculated by the function selected in step

208 identifies the relative degree to which a given content item is responsive to the selected query. The function selected in step 208 may comprise a function that generates a score for a given content item based upon one or more features of the content item and the query with respect to which the content item is associated. For example, the function selected in step 208 may comprise a function that examines one or more ranking features of a given content item, such as the in-links of a web page or the one or more characters comprising the uniform resource locator ("URL") of the web page to determine the extent to which such features match or are similar to the query. Alternatively, or in conjunction with the foregoing, the function selected, step 208, may examine the term frequency/inverse document frequency with respect to the selected query. Similarly, the selected function may examine the title associated with a given content item, such as a web page, to determine the extent to which such title matches or is similar with respect to the selected query. Those of skill in the art recognize the plurality of ranking features that may be used to generate a score identifying the degree to which a given content item is responsive to a given query.

The function is applied to the one or more ranked content items retrieved for the selected query, step 210. Accordingly, a score is calculated for a given of the one or more ranked content items, which according to one embodiment of the present invention, identifies the degree to which such content items are responsive to the selected query.

An analysis is performed to determine whether the query is a needy query, step 212, which according to the present embodiment is based upon the scores calculated for the one or more ranked content items. One or more techniques may be used to determine whether the selected query is needy based upon the scores calculated for the one or more ranked content items. According to one embodiment of the present invention, an average score is calculated for the one or more ranked content items. According to another embodiment of the present invention, a given value K is selected, wherein K comprises a positive integer, such as the value ten (10). An average of the first K scores among the ranked content items may be calculated and used to determine whether the selected query is needy, according to methods described herein.

A check is performed to determine whether one or more additional queries in the set of retrieved queries require analysis, step 214. If one or more additional queries require analysis, a next query is selected from among the one or more queries comprising the retrieved set, step 204. After an analysis has been performed with respect to the one or more queries comprising the retrieved set, processing terminates, step 216. As previously described, the one or more queries identified as needy queries may be used for a variety of purposes, including but not limited to, identifying additional content to be generated for a given needy query, such as one or more web pages or advertisements responsive to the needy query or for identifying one or more content items to retrieved during a crawl cycle.

Figure 3:
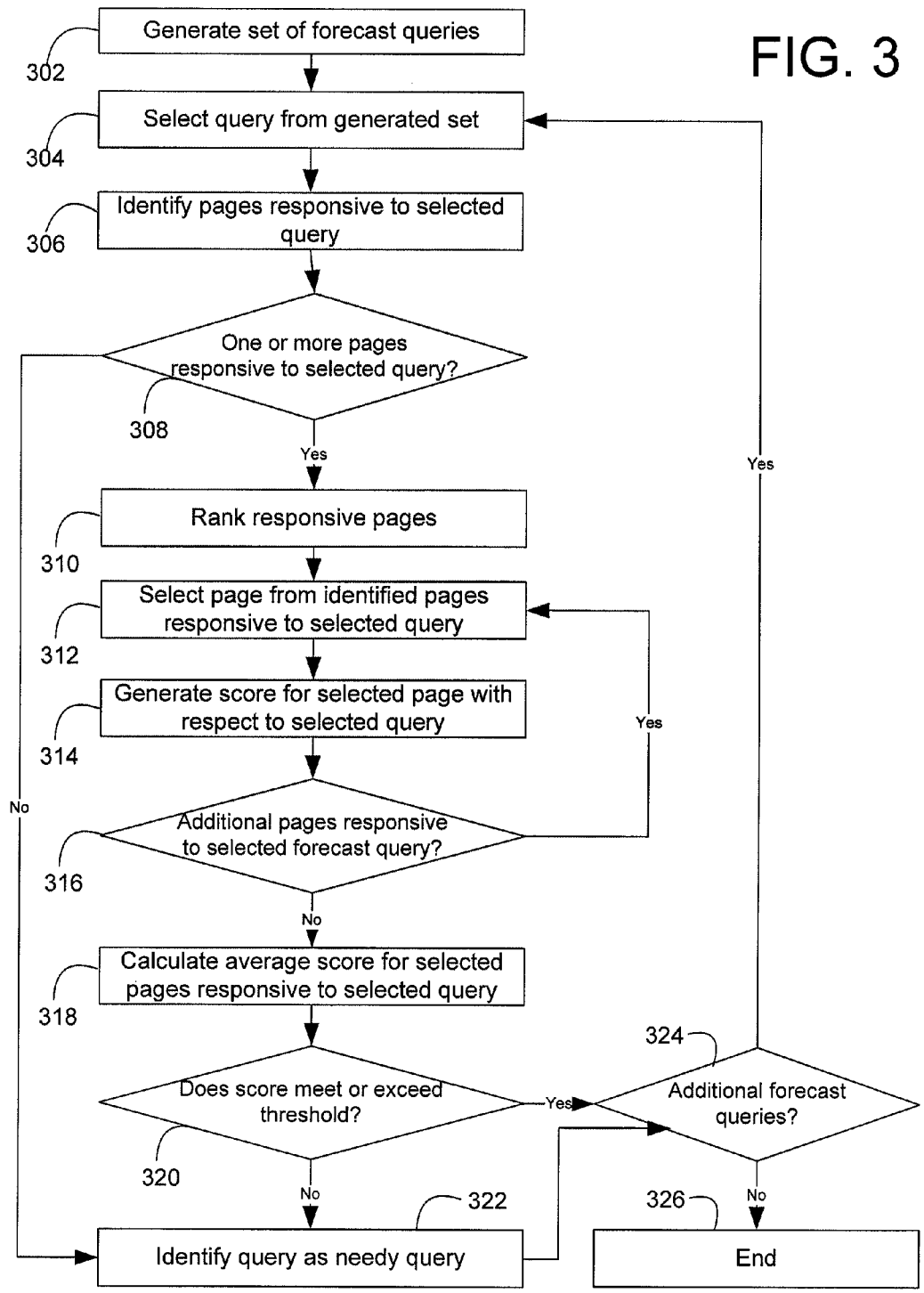
FIG. 3 is a flow diagram illustrating one embodiment of a method for forecasting the neediness of one or more queries according to one embodiment of the present invention.

FIG. 3 is a flow diagram illustrating one embodiment of a method for identifying one or more needy queries from a given set of forecasted queries, wherein a given forecasted query may comprise a query not previously supplied by a user. According to the embodiment illustrated in FIG. 3, a given set of one or more forecasted queries is generated, step 302, and a query is selected from among the one or more forecasted queries, step 304. A search is thereafter performed to identify one or more web pages responsive to the selected query, step 306. For example, through use of a search engine, a search may be performed to identify one or more web pages responsive to the selected query. A check is performed to determine whether one or more web pages were identified as responsive to the selected query, step 308.

If one or more web pages are identified as responsive to the selected query, such web pages are ranked according to one or more ranking techniques, step 310. For example, as previously described, a search engine may be used to identify one or more web pages responsive to the selected query. The search engine may further utilize a ranking function to rank the one or more identified web pages. The ranking function may utilize one or more features of the query and one or more features of the web pages identified as responsive to the query in order to rank the one or more web pages based upon the degree to which such web pages are responsive to the selected query. Such features may include, but are not limited to, information regarding in-link data or URL data, as well as information regarding the one or more terms appearing in a web page or the title of a web page.

A given page is selected from among the one or more ranked pages responsive to the selected forecasted query, step 312. A score is generated for the selected web page, wherein according to one embodiment of the present invention, the score comprises an indication of the degree to which the selected web page is responsive to the selected forecasted query, step 314. According to one embodiment of the present invention, the score is calculated through use of one or ranking features, which may include, but are not limited to, the number of in-links associated with the page, the anchor text associated with such in-links, or the one or more characters comprising the URL associated with the web page. Alternatively, or in conjunction with the foregoing, the ranking features may comprise the TF/IDF of the query with respect to the selected web page or the title associated with the selected web page.

A check is performed to determine whether one or more additional ranked web pages identified as responsive to the forecasted query require analysis, step 316. If one or more additional web pages require analysis, a next ranked web page is selected, step 312. An average score is calculated for the one or more ranked web pages through use of the above-mentioned scores associated with a given web page, step 318. Alternatively, a weighted average may be calculated, wherein a greater weight is placed upon the web pages that are associated with a more prominent rank. Those of skill in the art recognize the plurality of techniques with which an average score may be calculated for the one or more ranked web pages through use of the scores associated with a given respective web page.

A check is performed to determine whether the calculated average score meets or exceeds a given needy score threshold, step 320. If the average score calculated for the ranked pages identified as responsive to the selected query does not meet or exceed the needy score threshold, the selected forecasted query is identified as a needy query, step 322. If the average score calculated for the selected forecasted query meets or exceeds the needy score threshold, or after the selected forecasted query has been identified as a needy query, a further check is performed to determine whether one or more additional forecasted queries require analysis, step 324. If one or more additional forecasted queries require analysis, a next forecasted query is selected from among the one or more forecasted queries, step 304.

After an analysis has been performed with respect to the one or more forecasted queries, processing terminates, step 326. As described herein, the one or more queries identified as needy queries may be used for a variety of purposes. For example, the needy queries may be used to identify content that should be created, which is responsive to a given needy query. Alternatively, or in conjunction with the foregoing, the needy queries may be used to determine the one or more pages to fetch during a web page crawl cycle in order to retrieve additional content responsive to the one or more needy queries.

FIGS. 1 through 3 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computerized method for identifying needy queries for which additional responsive content is needed, the method comprising:
   retrieving a plurality of content items in a result set identified as responsive to each of a plurality of queries, wherein at least one of the plurality of queries is a forecasted query not previously generated by querying users and at least one of the queries is a query generated by one or more querying users;
   electronically generating, via a processing device, a score for the plurality of content items identified as responsive to the forecasted query;
   calculating an average of the scores associated with the plurality of content items identified as responsive to the forecasted query;
   determining the forecasted query is needy based upon a comparison of the calculated average of the scores with respect to a needy query score threshold,
   wherein a forecasted query is needy based on the calculated average of scores associated with the plurality of content items failing to meet the needy query threshold;
   determining the query generated by one or more querying users is needy based at least on a number of occurrences of the query generated by querying users exceeding a frequency threshold for queries with limited responsive content items; and
   identifying additional content items responsive to each of the plurality of queries to supplement the plurality of content items in the respective result set.

2. The method of claim 1 wherein the forecasted query is determined to be needy based on a sum of the scores generated for the plurality of content items.

3. The method of claim 1 wherein the one or more forecasted queries are generated on the basis of identifying one or more new content items and searching a store of previously generated queries.

4. The method of claim 1 comprising using needy queries to identify and recommend content to be posted by content providers.

5. A system for identifying needy queries for which additional responsive content is needed, the system comprising:
   a processing device operative to:
      retrieve a plurality of content items in a result set identified as responsive to each of a plurality of queries, wherein at least one of the plurality of queries is a forecasted query not previously generated by querying users and at least one of the queries is a query generated by one or more querying users;
      generate a score for the plurality of content items identified as responsive to the forecasted query;
      calculate an average of the scores associated with the plurality of content items identified as responsive to the forecasted query determine the forecasted query is needy based upon a comparison of the calculated average of the scores with respect to a needy query score threshold, wherein a query is needy based on the calculated average of the scores associated with the plurality of content items failing to meet the needy query threshold;

determine the query generated by one or more querying users is needy based at least on a number of occurrences of the query generated by querying users exceeding a frequency threshold for queries with limited responsive content items; and identify additional content items responsive to each of the plurality of queries to supplement the plurality of content items in the respective result set.

6. The system of claim 5 wherein the forecasted query is determined to be needy based on a sum of the scores generated for the plurality of content items.

7. The system of claim 5 wherein the one or more forecasted queries are generated on the basis of identifying one or more new content items and searching a store of previously generated queries.

8. Non-transitory computer readable media comprising program code that when executed instructs a processor to perform a method for identifying needy queries for which additional responsive content is needed, the method comprising:

instructions for retrieving a plurality of content items in a result set identified as responsive to each of a plurality of queries, wherein at least one of the plurality of queries is a forecasted query not previously generated by querying users and at least one of the queries is a query generated by one or more querying users;

instructions for electronically generating, via a processing device, a score for the plurality of content items identified as responsive to the forecasted query;

instructions for calculating an average of the scores associated with the plurality of content items identified as responsive to the forecasted query;

instructions for determining the forecasted query is needy based upon a comparison of the calculated average of the scores with respect to a needy query score threshold, wherein a forecasted query is needy based on the calculated average of scores associated with the plurality of content items failing to meet the needy query threshold;

instructions for determining the query generated by one or more querying users is needy based at least on a number of occurrences of the query generated by querying users exceeding a frequency threshold for queries with limited responsive content items; and instructions for identifying additional content items responsive to each of the plurality of queries to supplement the plurality of content items in the respective result set.

9. The computer readable media of claim 8 wherein the instructions for determining the forecasted query is needy comprise instructions for determining the forecasted query is needy based on a sum of the scores generated for the plurality of content items.

10. The computer readable media of claim 8 wherein the instructions for generating one or more forecasted queries comprises generating the one or more forecasted queries on the basis of identifying one or more new content items and searching a store of previously generated queries.

11. The computer readable media of claim 8 further comprising instructions for using needy queries to identify and recommend content to be posted by content providers.

* * * * *